(12) United States Patent  
Meijer et al.

(10) Patent No.: US 8,234,622 B2
(45) Date of Patent: Jul. 31, 2012

(54) CROSS PLATFORM COMPOSITIONAL WIDGETS

(75) Inventors: Henricus Johannes Maria Meijer, Mercer Island, WA (US); Danny Van Velzen, Redmond, WA (US); Jeffrey Van Gogh, Redmond, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1157 days.

(21) Appl. No.: 12/059,037

(22) Filed: Mar. 31, 2008

(65) Prior Publication Data

US 2009/0249282 A1    Oct. 1, 2009

(51) Int. Cl.
*G06F 9/44* (2006.01)

(52) U.S. Cl. ...................................... 717/104

(58) Field of Classification Search ................... None
See application file for complete search history.

(56) References Cited

U.S. PATENT DOCUMENTS

| | | | |
|---|---|---|---|
| 7,076,728 B2 | 7/2006 | Davis et al. | |
| 2003/0070061 A1* | 4/2003 | Wong et al. | 712/220 |
| 2003/0160822 A1 | 8/2003 | Belz et al. | |
| 2005/0086587 A1 | 4/2005 | Balz | |
| 2006/0248506 A1 | 11/2006 | Luo et al. | |
| 2007/0067769 A1 | 3/2007 | Geisinger | |
| 2007/0130541 A1 | 6/2007 | Louch et al. | |
| 2008/0222232 A1* | 9/2008 | Allen et al. | 709/201 |
| 2008/0235602 A1* | 9/2008 | Strauss et al. | 715/762 |
| 2009/0235149 A1* | 9/2009 | Frohwein | 715/205 |

OTHER PUBLICATIONS

Xavier Amatriain, et al. Developing Cross-Platform Audio and Music Applications with the Clam Framework http://www.iua.upf.edu/mtg/publications/9d0455-icmc05-clam.pdf. Last accessed Nov. 28, 2007, 8 pages.

Michael Arrington. Netvibes Promises Cross-Platform Widget Compatibility, Feb. 21, 2007 http://www.techcrunch.com/2007/02/21/netvibes-promises-cross-platform-widget-compatibility/. Last accessed Nov. 28, 2007, 9 pages.

Balazs Fejes. Programming Konfabulator Widgets http://fb2.hu/x10/Articles/ProgrammingWidgets.html. Last accessed Nov. 28, 2007, 6 pages.

Kevin Ollivier. wxWidgets Features http://www.wxwidgets.org/about/feature2.htm. Last accessed Nov. 28, 2007, 7 pages.

Andrew Binstock. Qt 4 Raises the Bar for Cross-Platform App Dev Tools, Oct. 21, 2005. http://www.computerworld.com.au/index.php/id;502640359;fp;4;fpid;611908207. Last accessed Nov. 28, 2007, 3 pages.

Josh Catone. MuseStorm Launches New Widget Creation and Distribution Platform. Sep. 24, 2007 http://www.readwriteweb.com/archives/musestorm_launches_new_widget_platform.php. Last accessed Nov. 28, 2007, 2 pages.

* cited by examiner

*Primary Examiner* — Philip Wang

(57) ABSTRACT

Mechanisms are afforded for supporting cross platform widgets. A generic widget can be converted into a specialized widget of a corresponding platform. Dually, a specialized widget can be generalized to a generic widget for subsequent deployment on the same or different host. Furthermore, support is provided for compositional widgets across platforms.

13 Claims, 14 Drawing Sheets

CROSS PLATFORM COMPOSITIONAL WIDGETS

BACKGROUND

Widgets are an increasingly popular technology. Widgets or gadgets are mini applications that afford a limited set of information and/or functionality. In other words, they are designed to perform a single task well. Typically, widgets are comprised of a metadata (e.g., XML), code (e.g., JavaScript), and a declarative user interface (e.g., HTML). The metadata provides widget configuration information such as an identifier, name, version, description, and author, among other things. The code specifies functionality associated with a widget, and the user interface provides a mechanism to present data to and receive data from a user.

Widgets can be designed to perform various tasks. In many cases, widgets are written to acquire and potentially aggregate data from other sources. For example, stock information be retrieved from one or more websites and utilized as part of a stock ticker widget. Alternatively, an application can be accessed, for instance via an application programming interface (API), to identify the status of system resources such as battery charge remaining for a battery widget. However, some widgets simply provide entertainment in the form of various games users can play such as crossword puzzles, poker, solitaire, and checkers.

There are two broad categories of widgets, namely web and desktop. The distinction is mainly one of location. Web widgets refer to widgets that are embedded within a web page. For instance, widgets can be incorporated into personal web pages, blogs, wikis, and social networking sites to enhance personal experience or the experience of visitors. In one implementation, web widgets are simply smaller web pages embedded into a larger web page. As the name suggests, desktop widgets refer to widgets that reside on a portion of a device desktop. In this scenario, a widget engine is installed on a computer to enable hosting widgets on a desktop. In addition to supporting presentation, widgets employ the engine to process internal and/or external requests.

Regardless of type, widgets can be obtained in various ways. First, a user can develop and deploy his/her own widget utilizing a widget toolkit, for instance. Additionally or alternatively, widgets can be obtained from third parties including particular vendors and other users who share their widgets. Widget format can vary based on where the widget was designed or acquired as well as an associated widget platform.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to cross platform widgets. A system or framework is provided to enable employment and combinations of widgets designed for operation on different widget platforms. In accordance with one aspect of the disclosure, generic widgets can be employed to generate specialized widgets for particular widget platforms. Accordingly, a user can specify a widget once and enable deployment across various hosts. Dually, specialized widgets can be generalized to generic widgets and retargeted for specific widget platforms. According to another aspect of the disclosure, compositionality of widgets of the same or differing formats is supported. In other words, widgets can be combined or embedded in various ways to support aggregate functionality. Further yet, transformations can be performed statically and/or dynamically to enable aggregate functionality and/or ensure appropriate sandboxing or isolation given designated policies or the like.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to cross platform widgets are described in detail hereinafter. In particular, widgets can be retargeted for specific widget platforms. A generic widget format is employed to generate specialized widgets. This enables development of a single widget for use across platforms. Dually, a specialized widget can be generalized to a generic widget to enable retargeting. Further yet, mechanisms are provided to support compositionality of widgets of the same or dissimilar frameworks.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed.

Rather, the intention is to cover all modifications, equivalents, and alternatives falling within the spirit and scope of the claimed subject matter.

Figure 1:
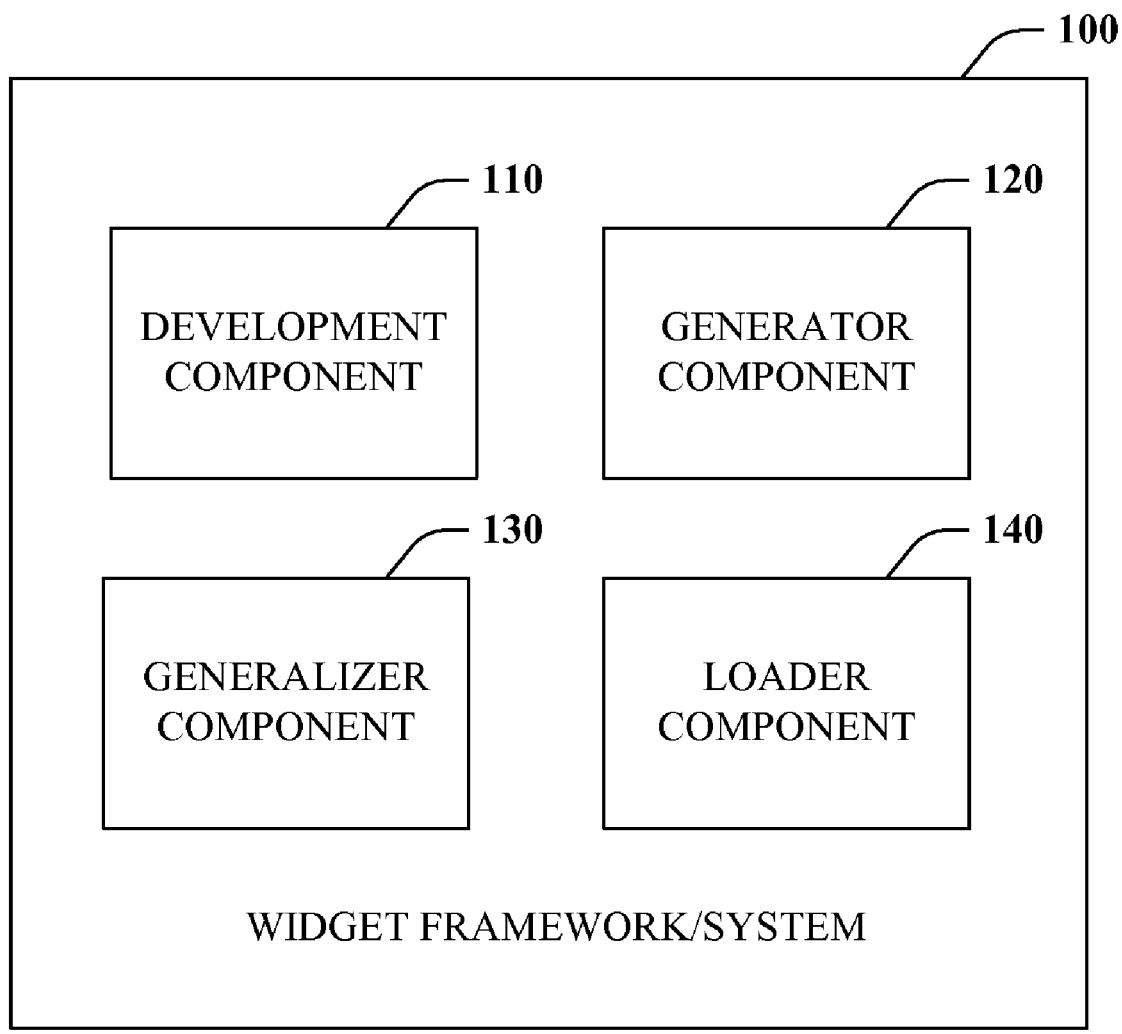
FIG. 1 is a block diagram of widget framework/system in accordance with an aspect of the disclosure.

Referring initially to FIG. 1, a widget system or framework 100 is illustrated in accordance with an aspect of the claimed subject matter. The system 100 includes a development component 110, generator component 120, generalizer component 130, and loader component 140. The development component 110 aids generation of a widget and more specifically a generic widget independent of a specific widget platform. The generator component 130 produces specialized widgets for particular platforms from generic widgets. The generalizer component 130 generalizes a special or specific widget into a generic widget. The load component 140 loads widgets into containers including embedding widgets within other widgets. In combination, the components of system 100 enable facilitate design and deployment of compositional widgets across widget platforms.

Figure 2:
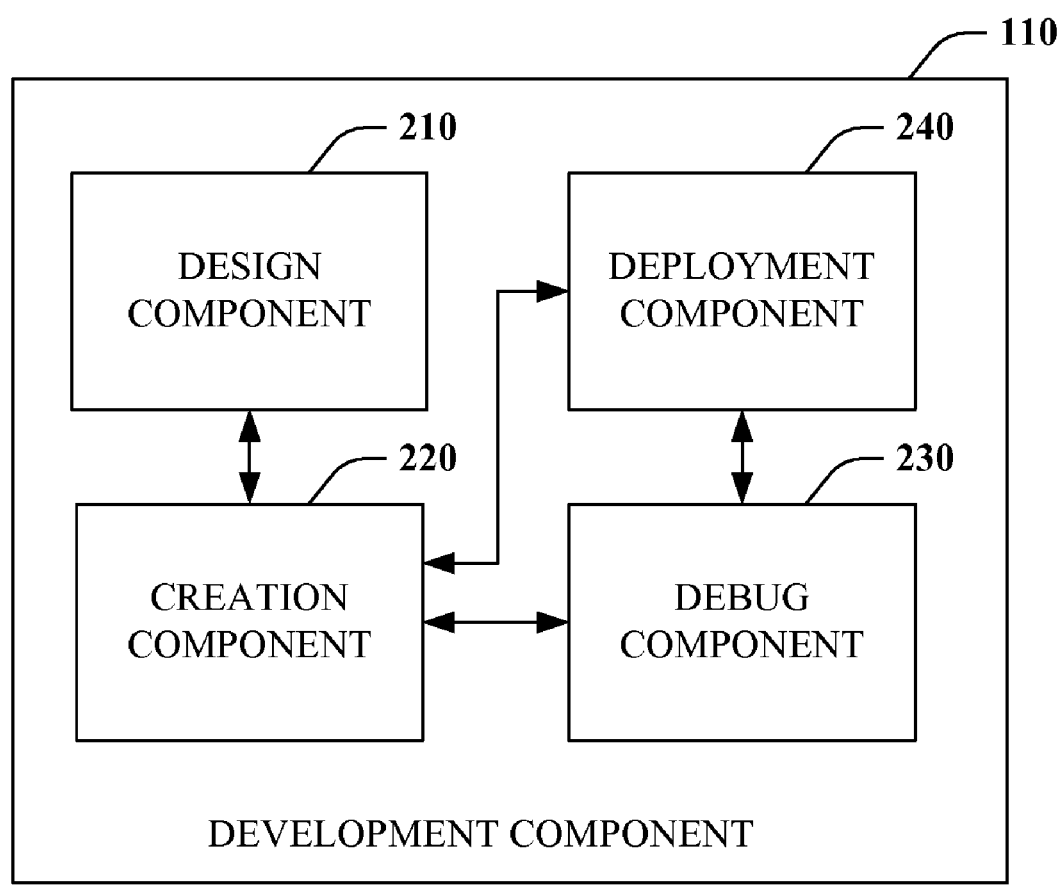
FIG. 2 is a block diagram of a representative development component according to a disclosed aspect.

Turning to FIG. 2, a representative development component 110 is depicted in accordance with an aspect of the claims. The development component 110 includes a design component 210 that aids users in designing a widget. For example, the design component 210 can include a plurality of graphical elements that can be dragged and dropped into a design space. Graphical panes or windows can also be employed to configure a widget or a wizard utilized to step a user through widget design. Creation component 220 can create an instance of a widget as a function of a design produced with the aid of design component 210, for example. An instance can include a user interface, code, and metadata, among other things. Where desired, debug component 230 can analyze a created instance in an attempt to locate programmatic errors or other issues statically and/or dynamically. Deployment component 240 initiates deployment of a created widget on a particular widget platform. According to one aspect, it should be appreciated, that the development component 110 can modify existing development tools or environments (IDEs) to support widget creation. Moreover, the development component 110 can facilitate production of a generic widget that can subsequently be utilized to generate a widget for any target widget platform.

Figure 3:
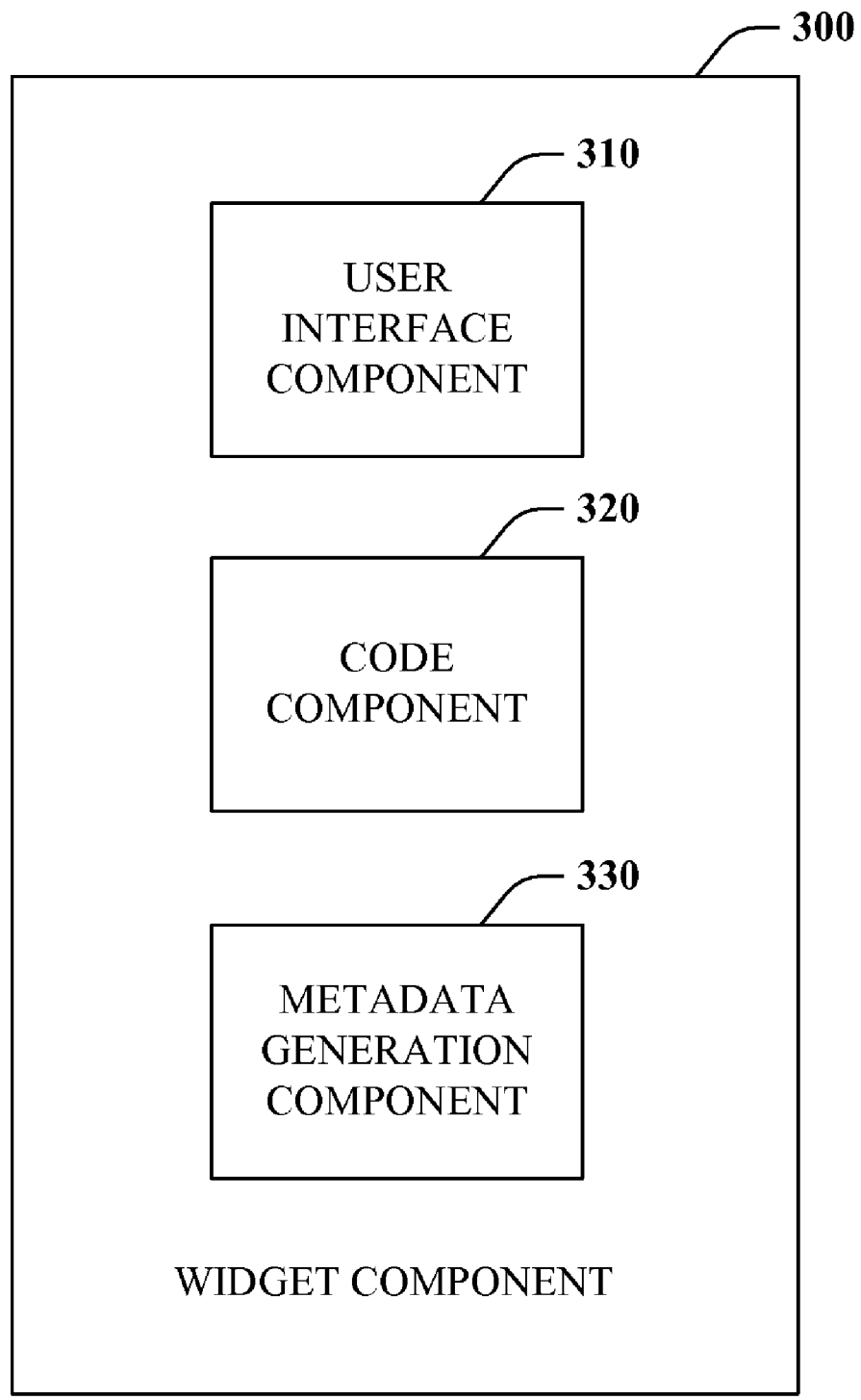
FIG. 3 is a block diagram of a representative generic widget component in accordance with an aspect of the disclosure.

FIG. 3 illustrates a representative generic widget component 300 in accordance with a claimed aspect. The generic widget component 300 corresponds to a widget format that is able to perform functionality associated with all other widget formats or map thereto. Similar to conventional widgets, the generic widget component 300 includes a user interface component 310 and code component 320. The user interface component 310 provides a mechanism to provide data to and/or receive data from a user. The code component 320 specifies functionality associated with the widget including but not limited to retrieval of data from other sources. The generic widget component 300 further includes metadata generation component 330.

Conventional widgets include declarative metadata for example specified in XML. Here, however, the metadata generation component 330 generates metadata as a function of particular arguments. In other words, rather than being static or fixed, metadata is returned dynamically. This can aid in translating generic widgets to specialized widgets as described further infra. Additionally, this dynamism enables the widget to adapt based on context. Consider, for instance, a widget simply prints out "Hello World." Where it is explicitly provided or can be determined or inferred that a device user is Spanish speaking, the widget can print the Spanish translation "Hola Mundo" rather than "Hello World." Additionally or alternatively, the current date can be injected. This is an extra layer of indirection being used here. Of course, the claimed subject matter is not limited thereto as static metadata can also be employed.

Figure 4:
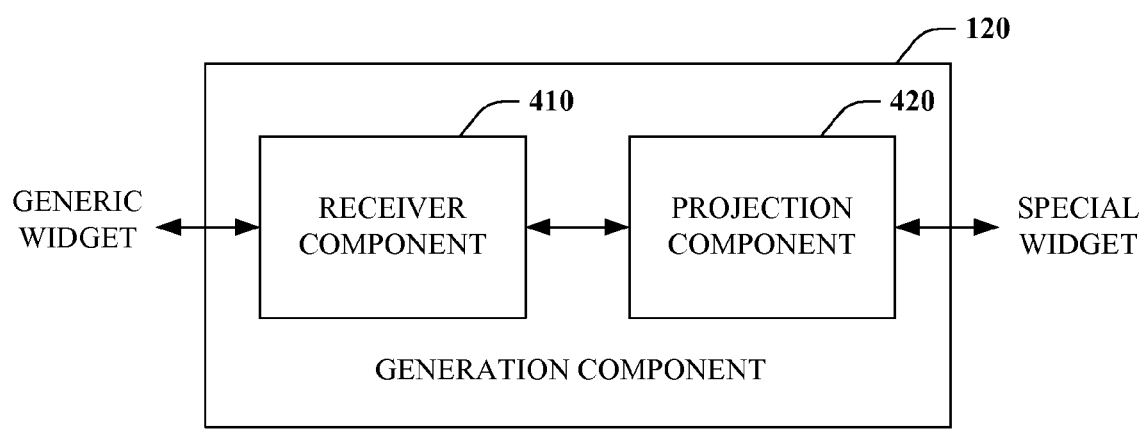
FIG. 4 is a block diagram of a representative widget generator component according to an aspect of the disclosure.

Referring to FIG. 4, a representative generator component 120 is depicted according to an aspect of the claimed subject matter. As previously mentioned with respect to FIG. 1, the generator component 120 facilitates generation of specialized widgets. As shown, the generator component 120 includes a receiver component 410 that can receive, retrieve or otherwise obtain or acquire a generic widget. This generic widget can then be provided to or otherwise made accessible by projection component 420. Upon acquisition or identification of a generic widget, the projection component 420 can project the widget into a corresponding special widget associated with a particular widget platform. Stated differently, the projection component can translate or transform a generic widget to a special or specialized widget.

Projection can be accomplished by altering or mapping a user interface, code, and/or metadata to another format. However, most widgets differ mainly in metadata or configuration information provided thereby. For example, consider a simple widget that prints out "Hello World." Below is the metadata for one conventional widget:

```
<?xml version="1.0" encoding="UTF-8" ?>
<Module>
    <ModulePrefs title="hello world example" />
    <Content type="html">
    <![CDATA[
        Hello, world!
    ]]>
    </Content>
</Module>
```

This same widget requires different metadata in another conventional format:

```
<?xml version="1.0" encoding="utf-8"?>
<widget>
    <widgetname>Hello World!</widgetname>
    <description>
        This is the very first widget written!
    </description>
    <width>473</width>
    <height>300</height>
    <author>
        <name>John Doe</name>
        <link>http://acme-widget.example.com</link>
        <organization>Acme Examples, inc.</organization>
    </author>
    <id>
        <host>example.com</host>
        <name>HelloWorld</name>
        <revised>2006-01</revised>
    </id>
</widget>
```

Despite similarities, these differences closely tie each different widget to their respective platforms. However, generator component 120 allows users to write widgets once in a generic format, and deploy them to run on different hosts. Where the widgets differ in metadata, the projection component 420 can ensure that a function associated with the metadata generation component 330 of a generic widget 300 (FIG. 3) is called with appropriate arguments to enable production of correct metadata for a format. For example, a wrapper can be applied to a widget. Other differences may need to be addressed in more extensive transformations or mappings. In one instance, code may need to be injected to support particular features/functionality not native to a target widget platform.

Figure 5:
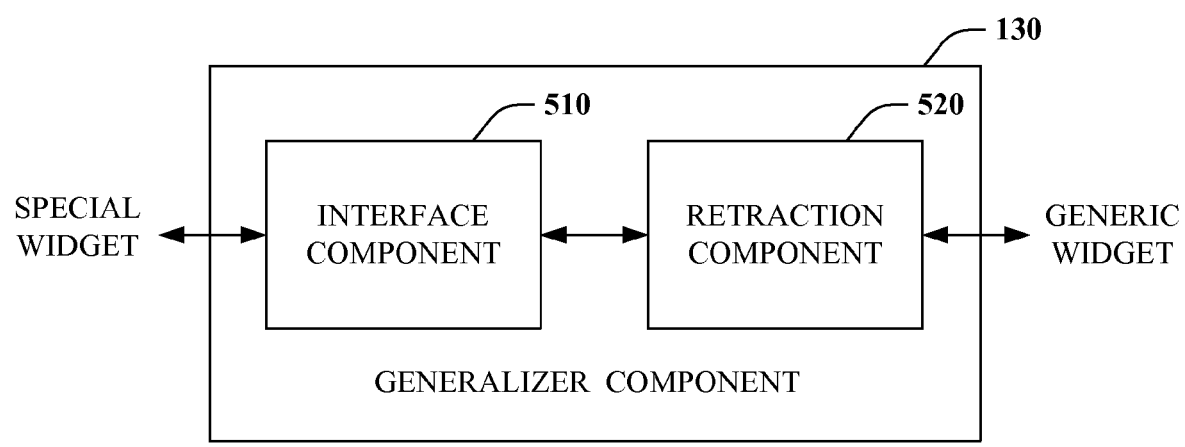
FIG. 5 is a block diagram of a representative widget generalizer component in accordance with a disclosed aspect.

Turning attention to FIG. 5, a representative generalizer component 130 is depicted in accordance with an aspect of the claimed subject matter. As previously described, the generalizer component 130 can generalize a specific widget to a generic format. The generalizer component 130 can include an interface component 510 and a retraction component 520. The interface component 510 receives, retrieves or otherwise obtains or acquires a special or specialized widget designed for a specific platform. The retraction component 520 reduces the special widget to a generic widget format. Stated differently, the reduction component 520 transforms a special widget into a generic widget. In large part, this can correspond to a mapping operation where elements in format "A" are mapped to elements in a generic format. Where the special widget was previously a generic widget and wrapped to produce a special widget, the wrapper can simply be identified and removed to reveal the generic widget once again.

The combination of generator component 120 and generalizer component 130 provide for many different combinations or permutations of special and generalized widgets. For example, a special widget can be converted into a generic widget by applying a wrapper, converted back to a generic widget by removing the wrapper and redeploy as a different special widget. In another instance, a specialized widget can be generalized to a generic widget utilized to generate the same special widget. In this case, the special widget would be equivalent but not exactly the same in terms of its implementation.

Figure 6:
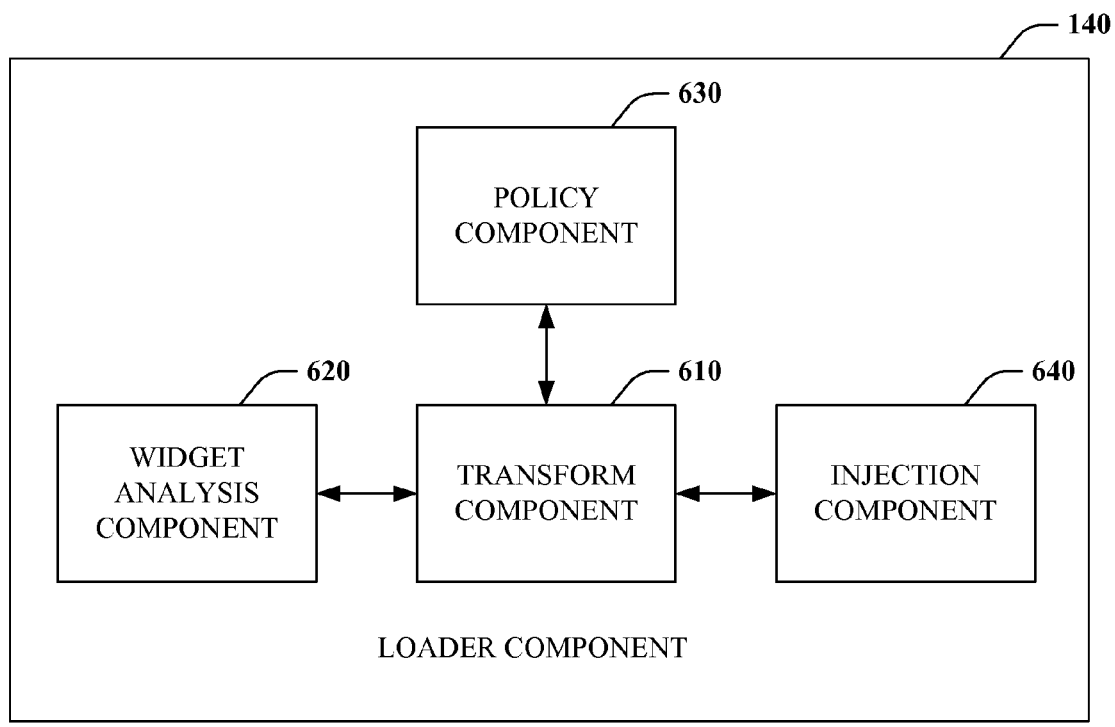
FIG. 6 is a block diagram of a representative loader component according to an aspect of the disclosure.

Referring to FIG. 6, a representative loader component 140 is illustrated according to an aspect of the claimed subject matter. The loader component 140 loads or facilitates loading of a widget for execution. This can correspond to loading a widget into memory in one instance. Unlike conventional loaders, the loader component 140 can perform substantial operations in preparing a widget for loading and ultimately execution. Theses operations enable compositionality of widgets. In other words, multiple widgets can be employed together and/or combined to provide aggregate functionality. As illustrated, the loader component 140 includes transform component 610, widget analysis component 620, policy component 630, and injection component 640.

The transform component 610 transforms widget code in accordance with input from widget analysis component 620 and/or policy component 630 and subsequently provides or otherwise makes transformed code available to injection component 640 for loading. The widget analysis component 620 can perform analysis on one or more widgets for loading. For instance, where one widget is to be embedded within another widget analysis component 620 can identify similar elements and/or identifiers. The transform component 610 can then transform identifiers to ensure uniqueness and thus correctness of combined widgets. By way of example, if both widgets include a button with different functionality linked thereto, there can be problems if both buttons have the same identifier. It can also provide a security hole. To address this issue, the transform component 610 can mangle or rename identifiers, for instance by pre-pending a widget's instance name. In this case, a button associated with a first and second widget with identifier "button1" can be rewritten as "widget1_button1" and "widget2_button1," respectively. Code that calls the buttons can be statically rewritten to call the correct identifier or calls can be intercepted and rewritten dynamically.

The policy component 630 provides one or more policies to be enforced by the transformer component 610. In one embodiment, the policy component 630 can specify security policies related to widget communication across a network and/or to and amongst each other. These polices can seek to sandbox and/or isolate widgets to various degrees based on context, for instance. By way of example, it may be desirable to execute widgets in separate processes to ensure that if one behaves badly, by eating up resources, for instance, it does not affect other widgets in the same container. Further, communication requests can be transformed to be redirected through particular communication mechanism that ensures safe interaction. For instance, if one widget provides access to bank account information it should be sufficiently isolated from other widgets so that a weather widget, for example, cannot sneakily transfer funds. However, where a bank widget is employed together with a stock trading widget, then it may be okay to allow one widget to communicate with the other to shift funds. Accordingly, policies can be specified across a spectrum from full access or transparency to complete isolation of opaqueness. Boundaries between widgets can thus be range from permeable to semi-permeable to impermeable.

Figure 7:
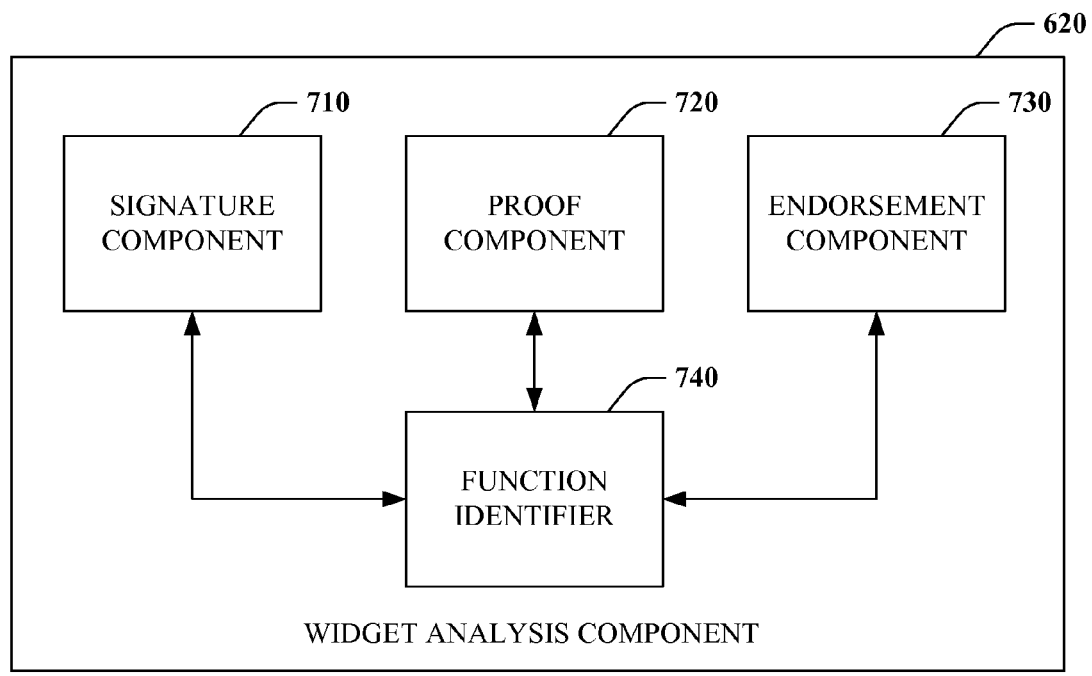
FIG. 7 is a block diagram of a representative widget analysis component in accordance with a disclosed aspect.

FIG. 7 depicts a representative widget analysis component 620 in accordance with an aspect of the claimed subject matter. The analysis component 620 includes signature component 710, proof component 720, and endorsement component 730 to facilitate transformation (or complete blocking) of widgets. The signature component 710 scans a widget implementation and seeks to determine if it matches one or more widget signatures. The signatures can be indicative of known unsafe and/or safe code and affect transformation given a particular policy related to that signature.

Proof component 720 is a mechanism that identifies a proof carried by a widget and seeks to validate or check the proof to ensure it does not violate a particular policy or alternatively that it satisfies a policy. If the widget satisfies a policy then it may be loaded. Further, transformations can be governed by proof validation. If a widget carries a proof that is validated it may be transformed in one way whereas if it does not carry a proof or the proof cannot be validated it is transformed in yet another way (e.g., with limited functionality).

The endorsement component 730 identifies an endorsement of a widget. For example, a website, social network or the like can be set up to enable individuals to endorse widgets. Endorsement can be based on known or observed characteristics of the widget. If an individual using a widget or otherwise determines that it does not behave badly, he/she can endorse it. The endorsement component 730 can contact one or more sites to identify endorsements of a particular widget. In one instance, a policy can be specified that only widgets endorsed by friends are loaded.

The widget analysis component 620 also includes a transformation function identifier 740 (also a component as defined herein). It is to be appreciated that a user can provide a transformation function with a widget specifying how a widget is to be transformed into another widget. This allows widget writers to customize how the widget functions. The widget analysis component 620 can also direct its analysis via the signature component 710, proof component 720, and endorsement component 730, to the transformation function in order to classify function behavior (e.g., well behaved, badly behaved . . . ).

It is to be appreciated that all or a portion of functionality provided by the loader component 140 can be performed dynamically. In one instance, the loader component 140 can perform rewriting statically or prior to execution. Additionally or alternatively, the same functionality can be effectuated dynamically at runtime. For example, a just in time compiler could be modified to support widget transformation at runtime. In another embodiment, widgets can include calls back to the widget system 100 that performs the transformation. In this manner, code loaded in memory that may or may not have been transformed statically can be subject to call interception, redirection, and/or rewriting.

Figure 8:
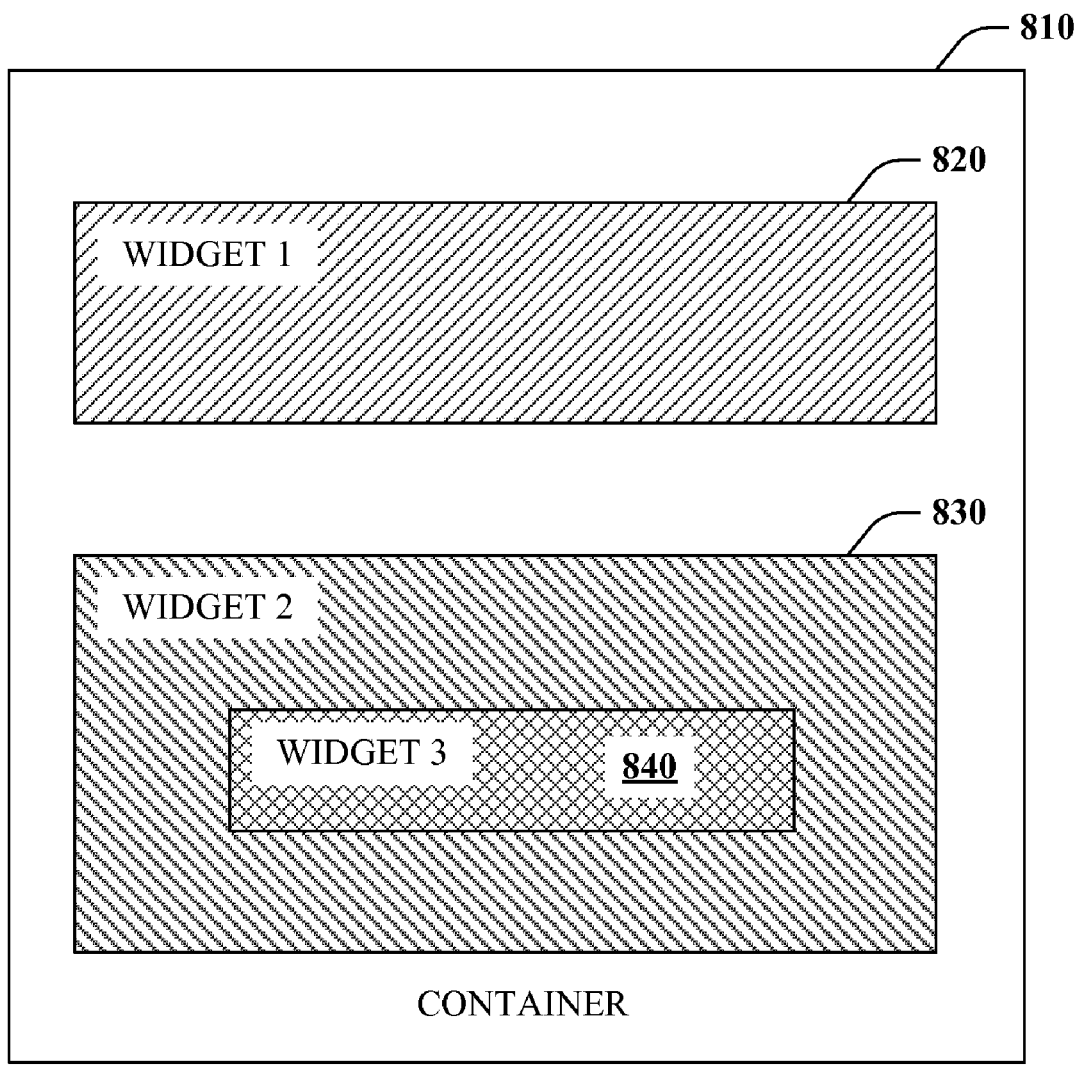
FIG. 8 is a graphical depiction of compositional widgets according to an aspect of the disclosure.

Turning to FIG. 8, a graphical depiction of compositional widgets is illustrated in accordance with an aspect of the claimed subject matter. As illustrated, a container 810, such as a web page for web widgets, can include a plurality of widgets. Here, "widget 1" 820 and "widget 2" 830 are provided within a single container 810 such as a web page. For example, "widget 1" 820 can be a weather widget and "widget 2" 830 can be a stock ticker widget. Moreover, "widget 2" 830 includes embedded "widget 3" 840, which can correspond to a calendar widget. In this instance, the merger of the stock ticker and calendar widget enables a user to see stock prices on different dates utilizing the calendar as a date specification means. This is of course an example of only one level of embedding—multiple levels of embedding are possible. For example, the weather widget could also be incorporated into the calendar widget to show the weather associated with selection of a particular calendar date and presentation of stock information. Note that mechanisms can also be in place to govern boundary interactions between widget 2 830 and widget 3 840 based on a policy (e.g., permeable, semi-permeable, impermeable boundary). Furthermore, it should be appreciated "widget 1" 820 could be a platform "A" widget, "widget 2" 830 a platform "B" widget, and "widget 3" 840 a platform "C" widget all of which are hosted in container 820 of platform "D." In other words, the widgets 820, 830, and 840 have been retargeted from a various originating platforms to a target host platform.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the widget analysis component 620 can employ such mechanisms to infer potential code behavior.

In view of the exemplary systems described supra, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 9:
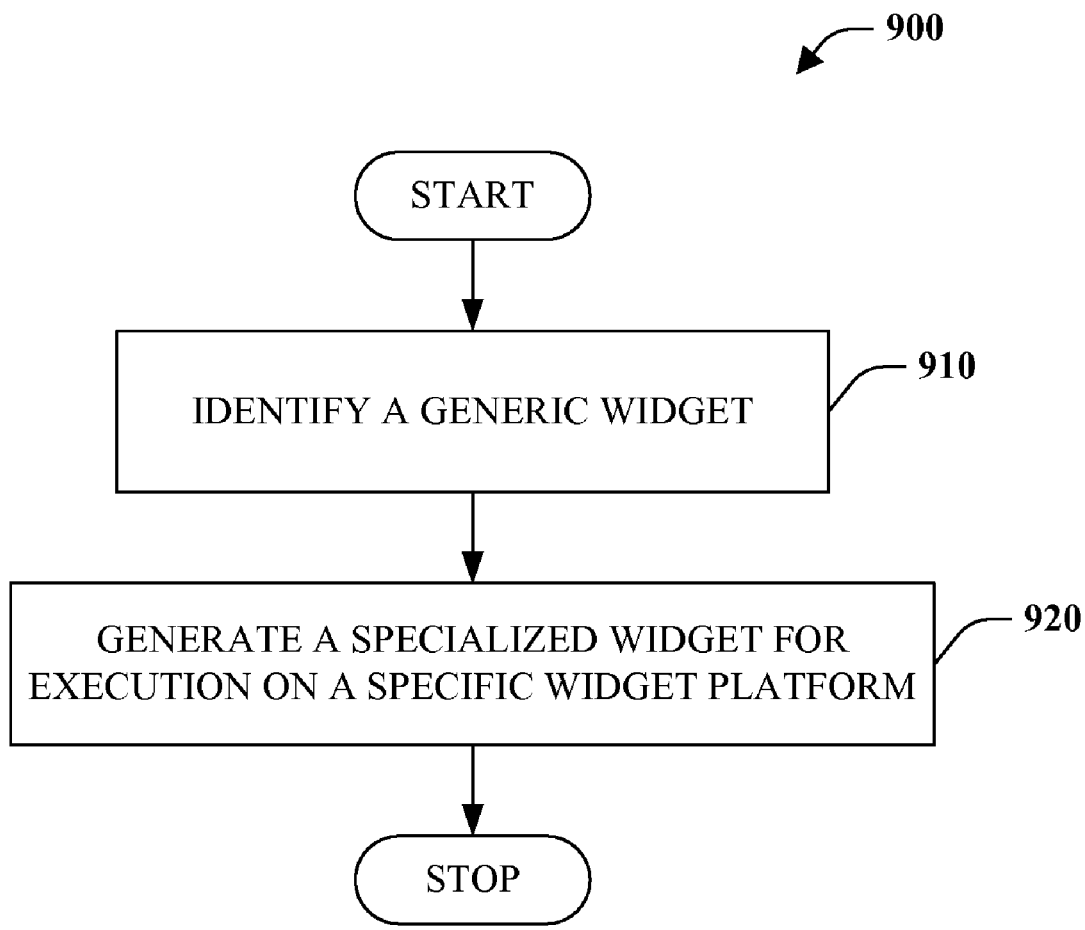
FIG. 9 is a flow chart diagram of a widget generation method in accordance with an aspect of the disclosure.

Referring to FIG. 9, a widget generation method 900 is depicted in accordance with an aspect of the claimed subject matter. At reference numeral 910, a generic widget is identified, received, or retrieved. The generic widget can support or enable mapping to functionality of many different widget platforms. In one instance, the generic widget can include a metadata generation function to support dynamic production of configuration and like information. At reference numeral 920, a specialized widget executable on a specific widget platform is generated. Such generation can correspond to transforming the generic widget into a specific widget. This may mean full transformation or mapping of user interfaces, code, and/or metadata. In one instance, a wrapper can be applied to the generic widget to transform it into a specific widget. In most instances, however, widgets generate mainly in metadata. Accordingly, the wrapper can seek to provide appropriate information to the metadata function to enable generation of appropriate static metadata for the specialized widget. It is also to be appreciated that where a specialized widget does not support functionality specified by the generic widget, code that captures the functionality can be automatically generated and injected within the specialized widget.

Figure 10:
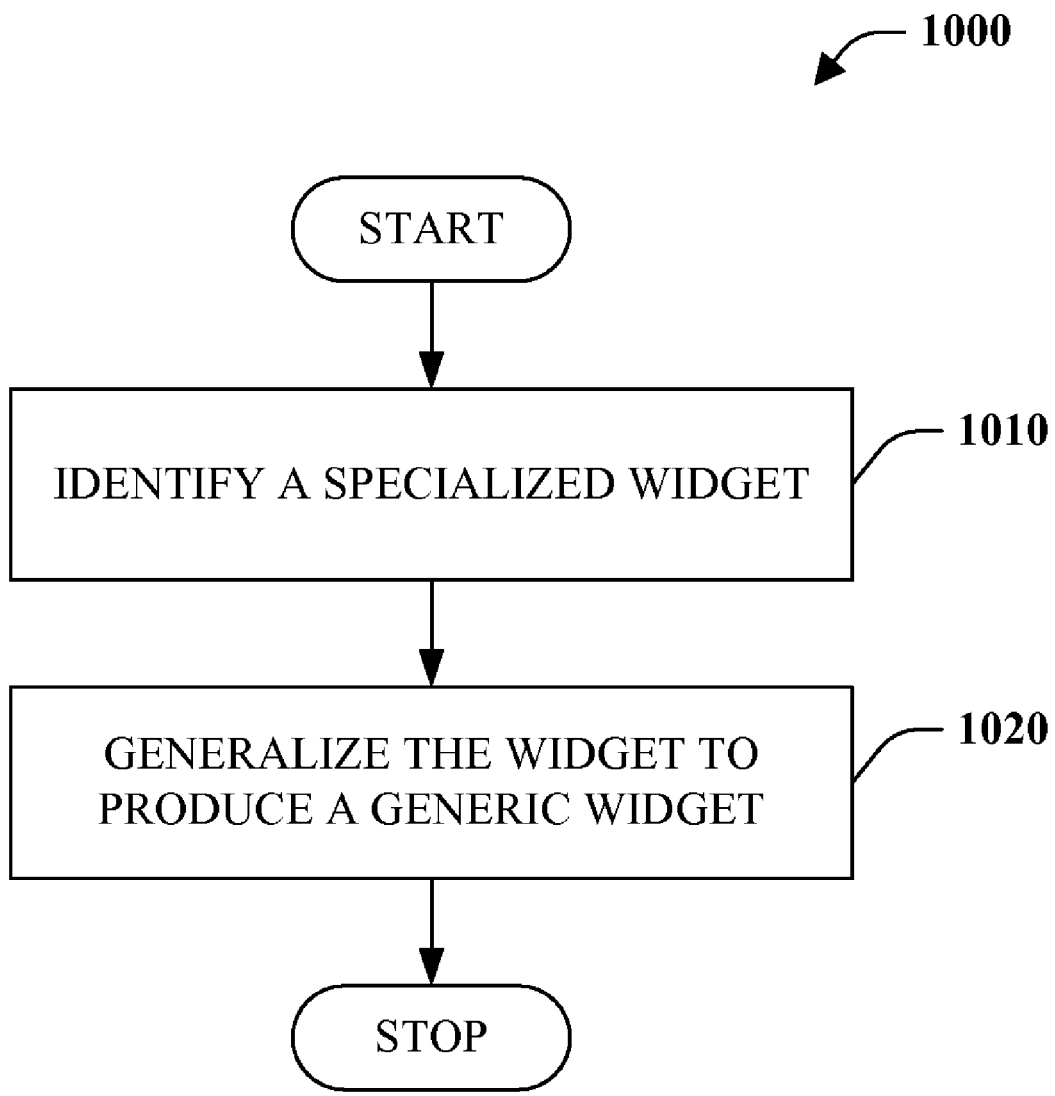
FIG. 10 is a flow chart diagram of a method of widget generalization in accordance with a disclosed aspect.

FIG. 10 illustrates a method 1000 of widget generalization in accordance with an aspect of the claimed subject matter. At reference numeral 1010, a specialized widget is identified, received, retrieved, or otherwise acquired. A special or specialized widget is one that is designed to work with a single widget platform, engine, or the like. At reference numeral 1020, the specialized widget is generalized to produce a generic widget. This can correspond to mapping or translating features of the special widget to the same features of a generic widget. Where the specialized widget was previously generated from a generic widget, generalization can be accomplished by removing the specialized wrapper. A generic widget can be converted, subsequently, to any specialized widget including that widget type from which it was generalized.

Figure 11:
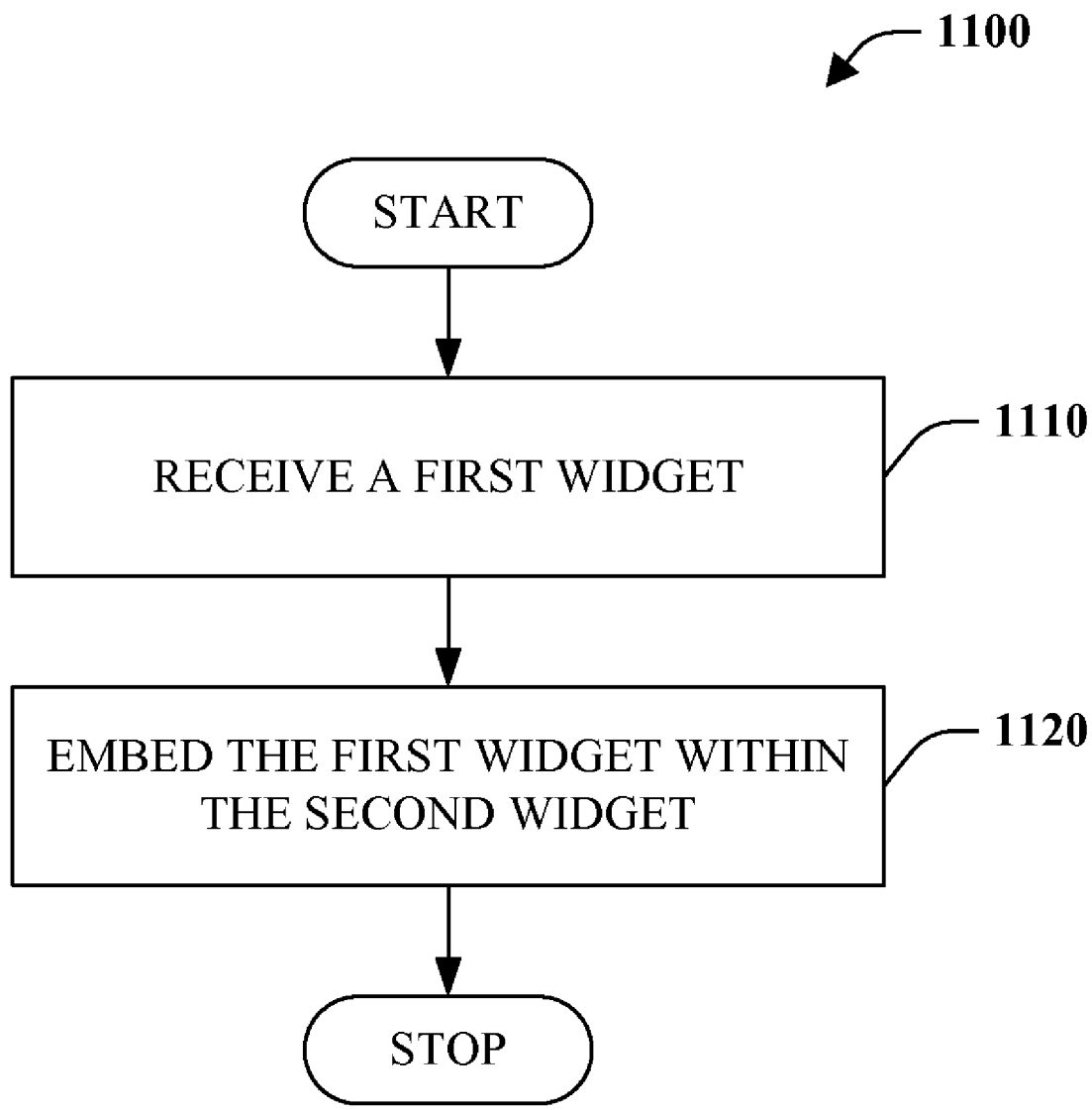
FIG. 11 is a flow chart diagram of a method of widget employment according to an aspect of the disclosure.

FIG. 11 is a flow chart diagram of a method of widget employment 1100 in accordance with an aspect of the claimed subject matter. At reference numeral 1110, a first widget is received, retrieved, or otherwise acquired or identified. At numeral 1120, the first widget is embedded within the second widget. For example, a calendar widget is embedded within a news widget to enable historical news to be able to be retrieved by data as indicated via a calendar. In accordance with an aspect of the claims, the first and second widgets can originate from differing widget platforms and be hosted by yet another widget platform. Accordingly, various generalization and generation operations can be performed to retarget widgets to the appropriate widget platform. Furthermore, it is to be appreciated that more than one widget can be injected into another widget and there can be more than one level of embedding.

Figure 12:
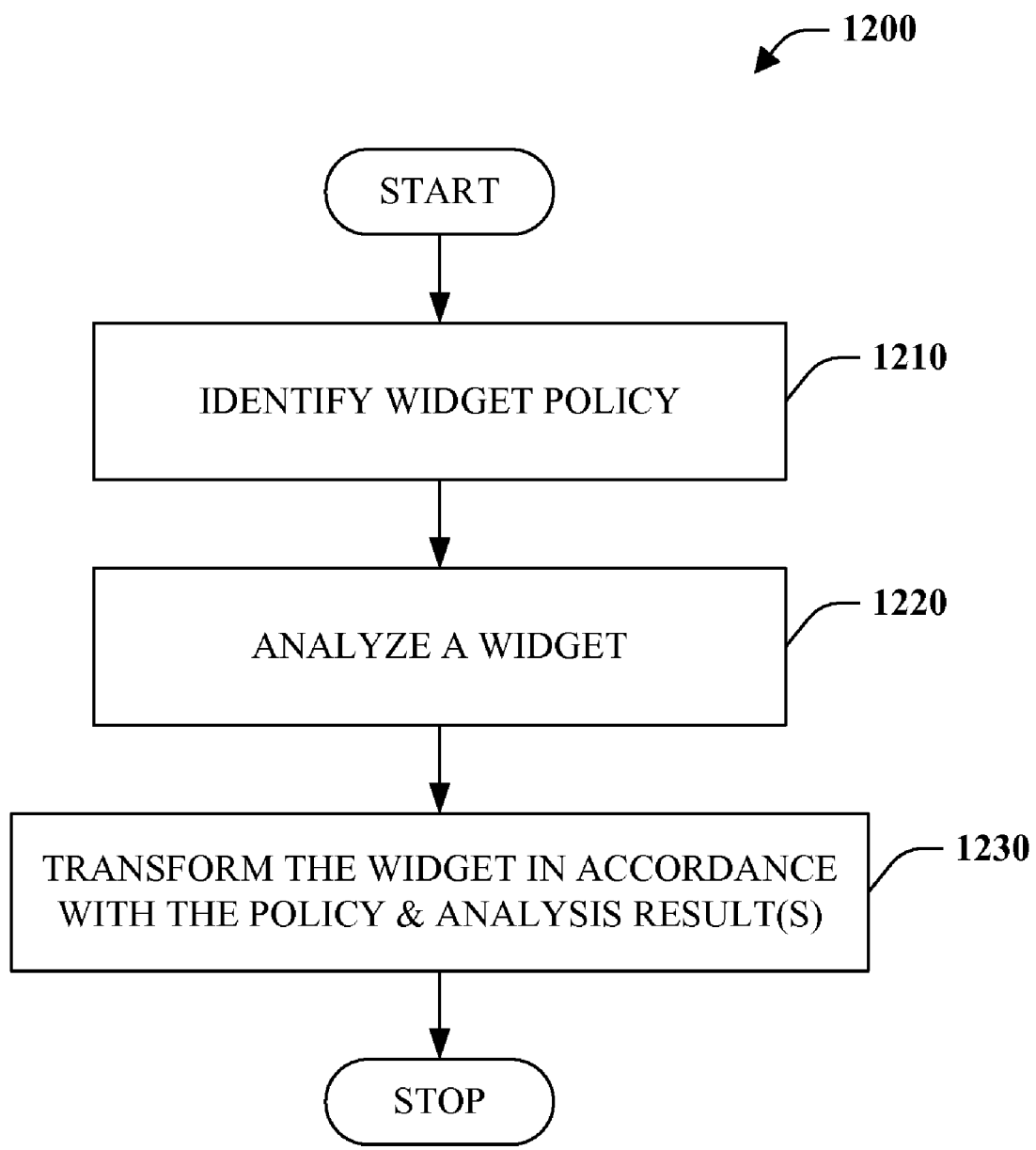
FIG. 12 is a flow chart diagram of a widget transformation method according to a disclosed aspect.

FIG. 12 depicts a method of widget transformation according to an aspect of the claimed subject matter. At reference numeral 1210, a widget policy is identified, received, or retrieved. The widget policy can specify preferences regarding widget functionality. For example, the widget policy can identify widgets or operations that are to be controlled or eliminated to affect a particular level security with respect widgets. At numeral 1220, a widget is analyzed to determine the type, affect, implementation, and/or security of a widget. For instance, a widget can be analyzed to determine if it matches any known signature. Additionally or alternatively, a carried proof can be validated to ensure satisfaction of a particular policy. Still further yet, the analysis can involve identification of widget endorsements, among other things. At reference numeral 1230, the widget is transformed in accordance with one or more policies as well as results of the analysis. For example, transformations differ where the widgets include different signatures, endorsements, and/or proofs. In this manner, widgets can be sandboxed or isolated to various degrees. Further yet, method 1200 can be performed statically prior to execution or dynamically at runtime.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
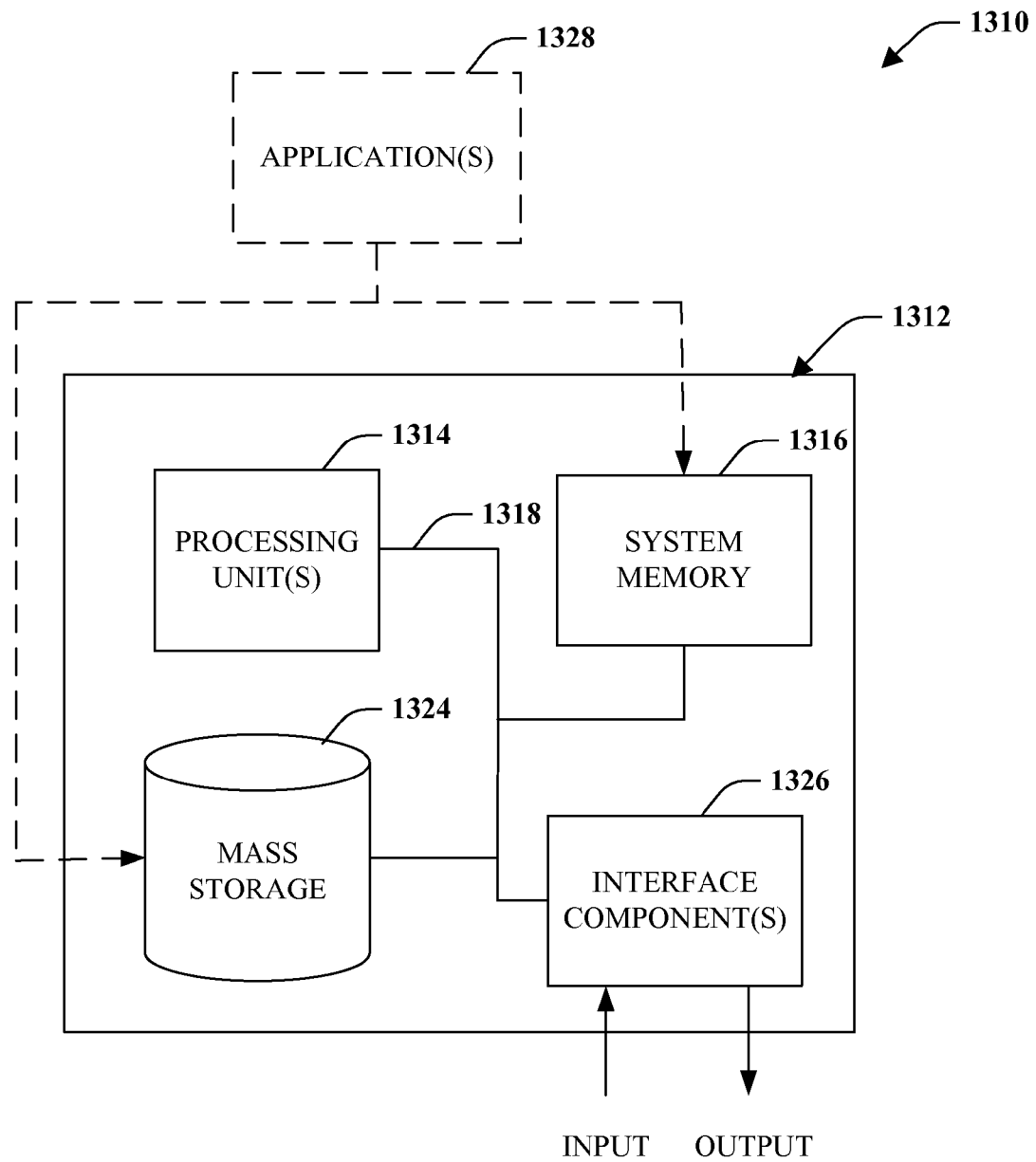
FIG. 13 is a schematic block diagram illustrating a suitable operating environment for aspects of the subject disclosure.
Figure 14:
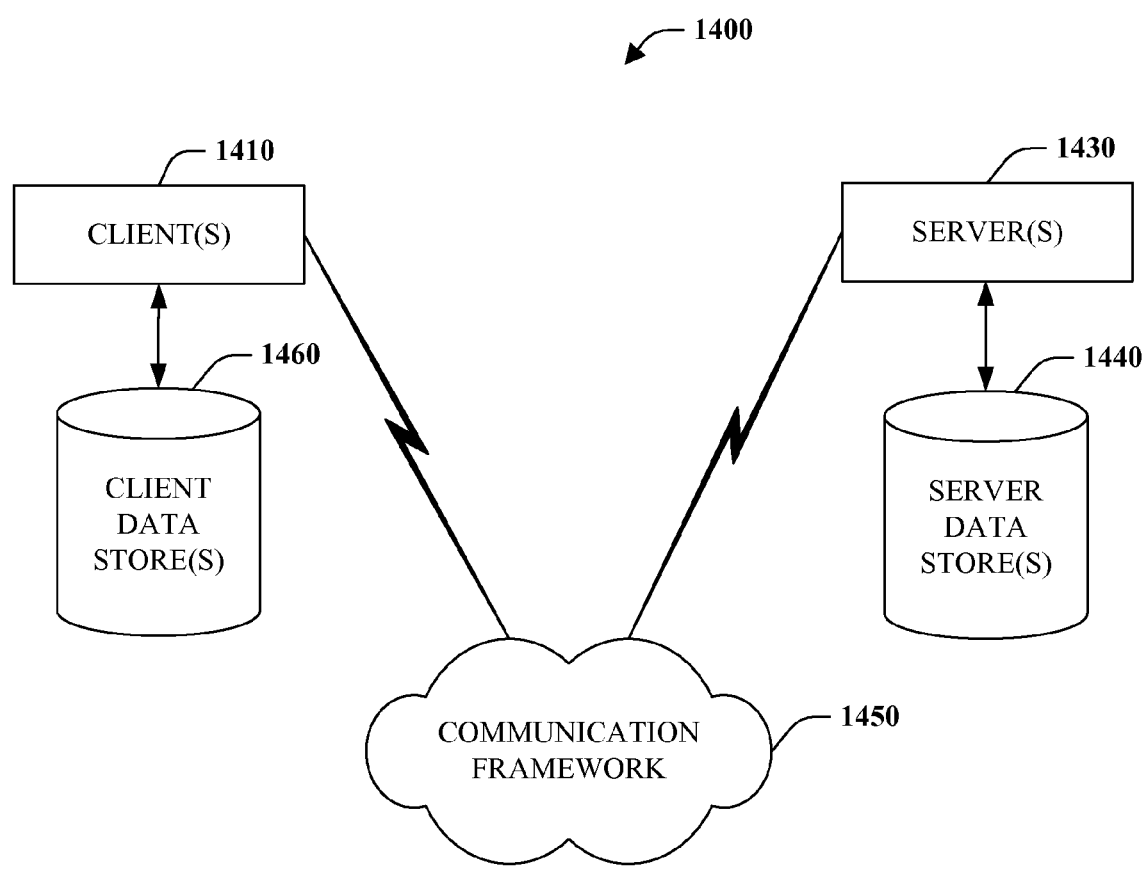
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/nonvolatile computer storage media. FIG. 13 illustrates, for example, mass storage 1324. Mass storage 1324 includes, but is not limited to, devices like a magnetic or optical disk drive, floppy disk drive, flash memory, or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1312 to output device(s) via interface component 1326. Output devices can include displays (e.g., CRT, LCD, plasma . . . ), speakers, printers and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430.

Client/server interactions can be utilized with respect with respect to various aspects of the claimed subject matter. By way of example and not limitation, specialized widgets can be acquired from one or more servers 1430 across the communication framework 1450 for execution on a client 1410 device desktop or like space. Additionally, clients 1410 can control embedding of web widgets provided on a web page by a server 1430 over the communication framework 1450. Further yet, a widget generation and/or generalization can be embodied as web services provided by one or more server 1430 and accessed by clients 1410 over the communication framework 1450.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A widget system, comprising:
   a computer comprising a processing unit coupled to a memory, the computer further comprising:
   a development component to facilitate construction of a first widget, wherein the first widget is a generic widget and comprises metadata that is generated as a function of particular arguments such that metadata is returned dynamically rather than being static;
   a transform component that transforms the first and/or second widget to facilitate compositionality, the transform component transforms the first and/or second widget by altering a user interface, code and metadata to another format, the transform component enables call interception and redirection; and
   a loader component that loads the first widget into a container, wherein the container is a second widget.

2. The system of claim 1, the transform component transforms the first and/or second widget in accordance with a policy that defines secure interaction on a spectrum from full access to complete isolation.

3. The system of claim 1, further comprising an analysis component that analyzes the first and/or second widget actions either statically or dynamically.

4. The system of claim 3, the analysis component checks a proof and/or endorsement associated with the first and/or second widget.

5. The system of claim 3, the analysis component analyzes a function that transforms a generic widget into a specific widget related to a specific widget platform.

6. The system of claim 1, further comprising a component that generates the first widget specific to a widget platform from a generic widget produced with aid from the development component.

7. The system of claim 6, the generic widget includes a function that produces declarative widget metadata specific to a widget platform to facilitate transformation from generic to specific.

8. A method of widget production, comprising:
   using a processing unit, transforming a specialized widget into a generic widget, transforming the specialized widget comprising removing a wrapper applied thereto;
   using the processing unit, acquiring the generic widget; and
   using the processing unit, generating a second specialized widget from the generic widget for execution on a specific widget platform; and
   applying a wrapper to the generic widget to produce the second specialized widget.

9. The method of claim 8, further comprising rewriting the generic widget as the second specialized widget statically prior to execution or dynamically at runtime.

10. The method of claim 8, generating the second specialized widget comprising calling a generic widget metadata function to produce specialized widget metadata for the second specialized widget.

11. The method of claim 8, further comprising generating the second specialized widget from a transformation function carried by the generic widget.

12. A widget system, comprising:
   means for transforming a specific widget to a generic widget, transforming the specialized widget comprising removing a wrapper applied thereto;
   means for generating a specialized widget for a corresponding platform from the generic widget; and
      means for loading the specialized widget into a container, wherein the container is a widget and/or includes other widgets; and
   applying a wrapper to the generic widget to produce the specialized widget.

13. The system of claim 12, further comprising a means for controlling interaction between embedded widgets.

* * * * *